Figure 1:
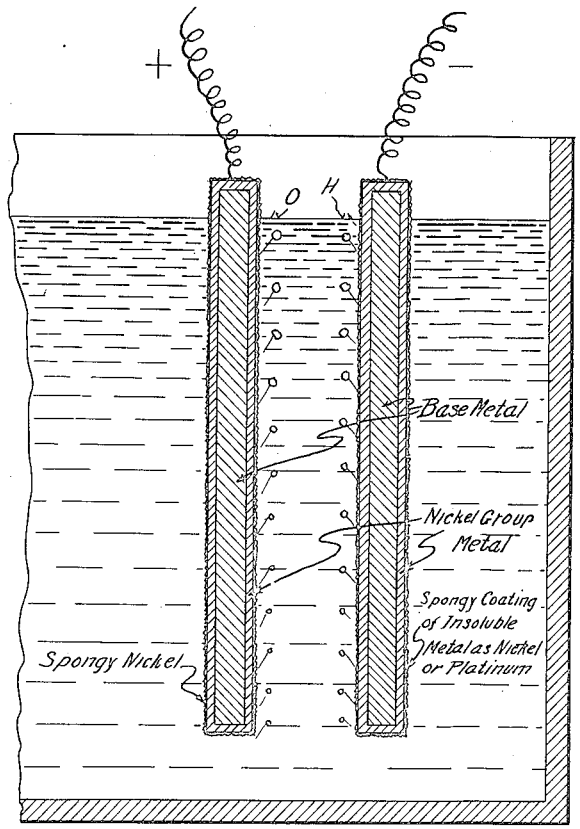

A. W. SMITH.
ELECTROLYTIC APPARATUS.
APPLICATION FILED NOV. 8, 1920.

1,427,171.

Patented Aug. 29, 1922.

Inventor
Albert W. Smith
By Hull Smith Brock & West
Attys.

UNITED STATES PATENT OFFICE.

ALBERT W. SMITH, OF CLEVELAND, OHIO.

ELECTROLYTIC APPARATUS.

1,427,171.                 Specification of Letters Patent.   Patented Aug. 29, 1922.

Application filed November 8, 1920. Serial No. 422,638.

*To all whom it may concern:*

Be it known that I, ALBERT W. SMITH, a citizen of the United States, residing at Cleveland, in the county of Cuyahoga and State of Ohio, have invented a certain new and useful Improvement in Electrolytic Apparatus, of which the following is a full, clear, and exact description, reference being had to the accompanying drawings.

In electrolysis of solutions and especially of those solutions wherein the product of decomposition is gaseous, there is a phenomenon known as over-voltage consisting of the excess in voltage, required to produce the actual evolution of the gases over that which is theoretically necessitated by thermodynamic requirements. At any voltage above the theoretical decomposition value there will be produced a collection of the products of decomposition at the surfaces of the electrodes, but, owing to this over-voltage condition, there will be no material evolution of the same until the impressed voltage arises to a definitely higher amount which depends upon the nature of the solution, the concentration of the solution, the nature of the electrode, the surface condition of the electrode, the temperature of the solution, and the current density.

In the practical electrolytic production of oxygen and hydrogen, whatever be the nature of the electrolyte, the hydrogen is evolved at the cathode and oxygen at the anode providing that a current of sufficient potential be employed. For practical purposes the best results are obtained with an electrolyte of potassium hydroxide from the facts that its corrosive effect upon the electrodes is less than that of acids, and that the solution offers a minimum of electric resistance. With such an electrolyte it is the common practice to employ electrodes of nickel or nickel-plated iron which are perfectly satisfactory as regards current conductivity and resistivity to corrosive action, but offer the disadvantage of possessing a high over-voltage, which, with customary current densities and electrolyte concentrations, may easily necessitate a potential of from 2¼ to 2½ volts, whereas the theoretical decomposition potential is only about 1¼ volts. This is equivalent to a current loss of from 45 to 50 per cent, all of which appears as heat which causes boiling and steaming, and requires dissipation by cooling water.

It is well known that the electrode material which offers the least over-voltage with respect to hydrogen is a plate of platinum covered with platinum-black (generally called "platinized platinum") but this is prohibitively expensive for commercial use. I have discovered, however, that the same kind of platinum deposit when applied to the surface of nearly any other common metal will serve nearly as well for all practical purposes, although I prefer to employ as a base a member of or plated with one or more metals of the nickel group in the periodic table, and preferably nickel (or cobalt) for the reason that the same is unaffected by the alkaline electrolyte under all conditions, even while the apparatus is standing idle. Considering the very great reduction in over-voltage produced thereby and the small amount of platinum necessary to produce the same, my experience shows that the saving is sufficiently great to warrant the expense of the comparatively small amount of platinum necessary to produce this result; but my experiments further show that results nearly as good can be obtained by the use of nickel or cobalt-black deposited in a similar manner upon the surface of any similar metal, and this with an absolute minimum of expense.

For the anode I prefer to employ an electrode either of nickel or of nickel-plated iron having a facial coating of nickel-black, and this likewise may be deposited upon the face of any nickel-group metal, but preferably on nickel itself (or cobalt) for the same reason as in the case of the cathode. My experiments show that cobalt-black operates equally well and may be used with similar results either alone or in admixture with nickel.

The electrodes may either be homogeneous throughout or they may be made of any cheap metal and coated with an impervious coating of nickel-like metal. On top of this surface there is deposited a pervious, spongy coating of the nickel (or platinum). Practically one of the cheapest modes of making my improved electrodes when a spongy nickel coating is employed, is by plating an iron body for a time, slowly, in any commercial nickel-plating solution until an impervious coating is obtained, then greatly increasing the density of both the solution and current for a short time to produce a spongy coating. The quality of this last coating can frequently be improved by alternating the direction of the current a few times very slowly.

Figure 2:

In the drawing accompanying and forming a part of this application I have shown in conventionalized form a pair of electrodes embodying my improvements, those shown in Fig. 1 being of base metal plated with a more resistant metal, and those shown in Fig. 2 being of homogeneous internal structure. It will be understood that they may be made of any desired shape and size required by the design of the apparatus.

By the use of my improved nickelized-nickel anode in combination with a platinized nickel cathode I have been able to decrease the working voltage approximately 20%; and by the use of nickelized-nickel for both anode and cathode I have been able to reduce the working voltage approximately 10 to 15%. The practical advantages secured are even greater than the saving in power alone because of the fact that under commercial conditions this excess current necessarily appears in the form of heat which has to be dissipated, whereas by my improvements this difficulty is automatically avoided.

My invention is especially designed for use in connection with the decomposition of water to produce oxygen and hydrogen, but is also available in other situations where either oxygen or hydrogen or both are evolved, provided only that no chemical substances are formed inside the electrolytes which attack such electrodes. By the term electrodes, anode, and cathode in my claims I refer especially to the superficial portions of the metal bodies since these only come into contact with the liquid; and in referring to the same as made of nickel, nickel group metals, etc., I mean only the superficial parts, since the internal parts that never come into contact with the liquid are not really electrodes but only supports and conductors for the active faces. Also by the term "nickel group metal" I mean nickel, cobalt or iron, in the order named, since iron, although more base, makes a spongy deposit whose over-voltage value is very small and which under operating conditions and in an alkaline medium shows a very fair degree of permanence.

Having thus described my invention, what I claim is:

1. Apparatus for the electrolytic decomposition of water comprising, in combination, a pair of electrodes consisting of metals from the nickel group in the periodic table having their faces covered by spongy coatings of metals unaffected by the electrolyte.

2. Apparatus for the electrolytic decomposition of water comprising a pair of nickel electrodes covered with a spongy adherent coating of a metal of low solution tension in the electrolyte employed.

3. Apparatus for the electrolytic decomposition of water comprising a nickelized nickel anode and a platenized nickel cathode.

4. Apparatus for the electrolytic decomposition of water comprising a nickelized nickel anode and a nickel cathode covered with a spongy deposit of a metal having a low hydrogen overvoltage.

5. Apparatus for the electrolytic decomposition of water comprising a pair of electrodes of nickel group metals, the anode covered with a spongy deposit of a metal which has a small oxygen overvoltage and the cathode covered with a spongy deposit of a metal which has a small hydrogen overvoltage.

6. Apparatus for the electrolytic decomposition of water comprising in combination a pair of electrodes consisting of base metals coated with impervious layers of metals from the nickel group in the periodic table which layers are in turn covered by spongy coatings of metals unaffected by the electrolyte and having a low overvoltage value relative to the gases evolved thereat.

7. An electrode for use in the decomposition of water made at least superficially of nickel, and covered with nickel black.

8. Apparatus for the electrolytic decomposition of water comprising metallic electrodes both of which are covered with a spongy deposit of a nickel group metal.

In testimony whereof, I hereunto affix my signature.

ALBERT W. SMITH.